United States Patent [19]

Nakaya et al.

[11] 4,406,869

[45] * Sep. 27, 1983

[54] PROCESS FOR PRODUCING ANHYDROUS SODIUM CARBONATE CRYSTAL

[75] Inventors: Keiichi Nakaya, Chiba; Kohji Kawanami; Suekazu Hirata, both of Ichihara, all of Japan

[73] Assignee: Asahi Glass Company Ltd., Tokyo, Japan

[*] Notice: The portion of the term of this patent subsequent to Sep. 20, 2000 has been disclaimed.

[21] Appl. No.: 226,168

[22] Filed: Jan. 19, 1981

[30] Foreign Application Priority Data

Feb. 4, 1980 [JP] Japan .................................. 55-11475

[51] Int. Cl.$^3$ .......................... C01D 15/08; B01D 1/00
[52] U.S. Cl. .................................. 423/421; 159/24 B; 423/206 T; 23/306
[58] Field of Search ............... 423/421, 426, 427, 190, 423/206 T; 159/24 A, 24 B; 23/306 T

[56] References Cited

U.S. PATENT DOCUMENTS

| | | | |
|---|---|---|---|
| 1,118,041 | 11/1914 | Nobel et al. | 159/24 B |
| 1,200,996 | 10/1918 | Söderlund et al. | 159/24 A |
| 2,133,455 | 10/1938 | Keene et al. | 423/421 |
| 3,212,848 | 10/1965 | Tasiaux | 423/421 |
| 3,628,919 | 10/1971 | Beauchamp et al. | 423/206 T |
| 3,653,848 | 4/1972 | Port et al. | 423/206 T |
| 3,656,892 | 4/1972 | Bourne et al. | 423/421 |
| 3,842,157 | 10/1974 | Neumann | 423/421 |
| 3,843,768 | 10/1974 | Neumann | 423/421 |
| 3,933,977 | 1/1976 | Ilardi et al. | 423/206 T |
| 4,183,901 | 1/1980 | Ilardi et al. | 423/421 |

FOREIGN PATENT DOCUMENTS

| | | | |
|---|---|---|---|
| 660545 | 4/1963 | Canada | 423/426 |
| 760890 | 6/1967 | Canada | 423/426 |
| 46-16664 | 5/1971 | Japan | 423/421 |
| 443101 | 6/1935 | United Kingdom | 423/421 |
| 2024187 | 1/1980 | United Kingdom | 423/421 |

OTHER PUBLICATIONS

Olsew, John C., Unit Processes and Principles of Chemical Engineering, DiVan Nostrand Co. Inc., N.Y., N.Y., 1932, pp. 1-3.

*Primary Examiner*—Gary P. Straub
*Attorney, Agent, or Firm*—Oblon, Fisher, Spivak, McClelland & Maier

[57] ABSTRACT

An anhydrous sodium carbonate crystal is produced by crystallizing a sodium carbonate hydrate crystal from an aqueous solution of sodium carbonate in a sodium carbonate hydrate crystallizing zone and transforming said sodium carbonate hydrate to an anhydrous sodium carbonate crystal in the presence of a crystal habit modifier in an anhydrous sodium carbonate crystallizing zone and recycling a separated mother liquor into said sodium carbonate hydrate crystallizing zone.

15 Claims, 3 Drawing Figures

PROCESS FOR PRODUCING ANHYDROUS SODIUM CARBONATE CRYSTAL

BACKGROUND OF THE INVENTION

1. Field of the Invention

The present invention relates to a process for producing a dense anhydrous sodium carbonate crystal by an aqueous solution reaction.

2. Description of the Prior Arts

The practical process employed as an industrial process for producing a dense anhydrous sodium carbonate crystal is characterized by calcining sodium bicarbonate to form porous anhydrous sodium carbonate; hydrating it into sodium carbonate hydrate; and treating it by a steam tubed dryer (STD). This process is complicated and requires a large energy consumption. In this process, a dense anhydrous sodium carbonate crystal is produced, but is not completely dense because the spaces are remained by removing water in the dehydration in the steam tubed dryer. The bulk density of the product has been in a range of about 1.0 to 1.1.

On the other hand, a process for producing the dense anhydrous sodium carbonate in an aqueous solution reaction has been reported.

One is the process disclosed in U.S. Pat. No. 2,133,455, wherein sodium hydroxide or sodium chloride are added to an aqueous solution obtained by decomposing sodium bicarbonate to decrease the transition temperature between sodium carbonate monohydrate and anhydrous sodium carbonate to be lower than a boiling point of the solution, and the solution is concentrated in an evaporator to crystallize an anhydrous sodium carbonate crystal. The anhydrous sodium carbonate crystal is crystallized by this process. In this process, the solution is concentrated by evaporating water by an evaporation, whereby the energy consumption is remarkably large.

The other known process is the process disclosed in Japanese Unexamined Patent Publication No. 7530/1980, wherein anhydrous sodium carbonate is produced by the transition of sodium carbonate hydrate in an aqueous solution of sodium carbonate containing 10 to 22 wt.% of sodium chloride at a temperature of 3° to 7° C. higher than the transition temperature for the transition. In this process, the content of sodium chloride is large to contaminate the product with a relatively large amount of sodium chloride as the impurity. Moreover, there is not a disclosure of the water balance. Therefore, the process is not used as the practical industrial process. On the latter problem, sodium carbonate monohydrate is used as the starting material and accordingly, the consideration for treating excess of water in the transition of sodium carbonate hydrate into anhydrous sodium carbonate is important in the industrial process. There is not any proposal for overcoming this problem.

SUMMARY OF THE INVENTION

It is an object of the present invention to provide a process for producing a dense anhydrous sodium carbonate crystal in an industrial process by an aqueous solution reaction from an aqueous solution of sodium carbonate.

The foregoing and other objects of the present invention have been attained by a process for producing an anhydrous sodium carbonate crystal which comprises crystallizing a sodium carbonate hydrate crystal from an aqueous solution of sodium carbonate in a sodium carbonate hydrate crystallizing zone and transforming said sodium carbonate hydrate to an anhydrous sodium carbonate crystal in the presence of a crystal habit modifier in an anhydrous sodium carbonate crystallizing zone and recycling a separated mother liquor into said sodium carbonate hydrate crystallizing zone.

Figure 1:
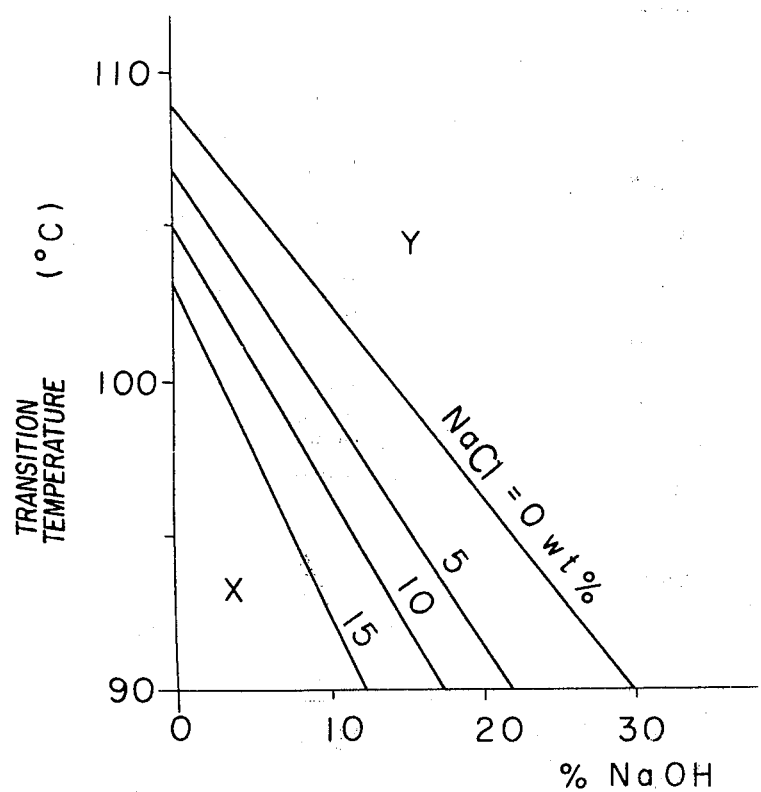
FIG. 1 is a graph showing transition temperatures between sodium carbonate monohydrate and anhydrous sodium carbonate in the presence of sodium chloride and sodium hydroxide wherein the left lower X region shows the stable region of sodium carbonate monohydrate and the right upper Y region shows the stable region of anhydrous sodium carbonate.

DETAILED DESCRIPTION OF THE PREFERRED EMBODIMENTS:

It has been known that an anhydrous sodium carbonate crystal is produced by crystallize it from sodium carbonate monohydrate in a stable zone of anhydrous sodium carbonate.

In the transition from sodium carbonate monohydrate to anhydrous sodium carbonate, one mol of free water is separated. The free water is accumulated in the zone for the transition whereby the concentration of an aqueous solution of sodium carbonate is gradually reduced. In order to maintain the saturated concentration, the free water should be separated. The conventional method of separating water is to evaporate water. This method requires a large energy consumption.

The inventors have found an industrial process for producing an anhydrous sodium carbonate having excellent quality in economical energy consumption.

The principle of the process of the present invention is to produce an anhydrous sodium carbonate crystal by crystallizing a sodium carbonate hydrate crystal from an aqueous solution of sodium carbonate in a sodium carbonate crystallizing zone (referring to A zone) and crystallizing an anhydrous sodium carbonate crystal in the presence of a crystal modifier in an anhydrous sodium carbonate crystallizing zone (hereinafter referring to B zone) and recycling a separated mother liquor into A zone.

The amount of water required for the crystallization of the sodium carbonate hydrate crystal from the aqueous solution of sodium carbonate is equal to the amount of water formed in the transition from the sodium carbonate hydrate crystal to the anhydrous sodium carbonate crystal. In view of this fact, water transferring is attained between A zone and B zone to overcome the above-mentioned problem.

The aqueous solution of sodium carbonate in A zone is not critical and can be obtained by dissolving light porous anhydrous sodium carbonate formed by thermaldecomposition of sodium bicarbonate into water or by reacting sodium bicarbonate with sodium hydroxide or by carbonation of sodium hydroxide.

The resulting aqueous solution of sodium carbonate is maintained at a saturated concentration in the sodium carbonate monohydrate crystallizing region to crystallize the sodium carbonate monohydrate crystal. The reaction heat is generated in the following reaction.

$$Na_2CO_3 + H_2O \rightarrow Na_2CO_3 \cdot H_2O \quad (1)$$

The slurry of sodium carbonate monohydrate formed in A zone is transferred into B zone. The condition in B zone is maintained in the anhydrous sodium carbonate crystallizing region thereby crystallizing an anhydrous sodium carbonate crystal. Water is separated by the following reaction in B zone.

$$Na_2CO_3 \cdot H_2O \rightarrow Na_2CO_3 + H_2O \quad (2)$$

This reaction is endothermic reaction and according heat is required.

Water separated by the reaction (2) is accumulated in B zone and accordingly, it should be separated since the aqueous solution of sodium carbonate is diluted to reduce the concentration from the saturated concentration in B zone. In the process of the present invention, the anhydrous sodium carbonate crystal crystallized in B zone is separated from the mother liquor and the mother liquor is recycled into A zone. Water separated in B zone and contained in the mother liquor can be used as water in the reaction (1) in A zone. Thus, in A zone, only the source for the aqueous solution of sodium carbonate is fed into A zone whereby the reaction (1) and the reaction (2) are smoothly performed in A zone and B zone. In the practical operation, in the separation of anhydrous sodium carbonate crystallized in B zone, a small amount of water is included in the crystal. The amount of water discharged should be fed into A zone.

As the effective manner, reaction heat generated by the reaction (1) in A zone utilizes as the reaction heat for the reaction (2) in B zone. In the particular process, the reaction heat in A zone is obtained as steam and the steam is fed into B zone if necessary through a blower, and the steam is condensed in B zone.

The crystallization of the anhydrous sodium carbonate crystal in B zone will be illustrated.

When sodium carbonate crystal is crystallized from an aqueous solution of sodium carbonate, the transition temperature between the anhydrous sodium carbonate and the sodium carbonate monohydrate is about 112° C. Therefore, only sodium carbonate monohydrate crystal is obtained except increasing a boiling point of the aqueous solution of sodium carbonate to be higher than 109° C., under higher pressure. This fact is well known. It has been proposed to reduce the transition temperature by incorporating sodium chloride in the aqueous solution of sodium carbonate. The effect has not been satisfactory. In order to reduce the transition temperature below the boiling point of the aqueous solution of sodium carbonate, the amount of sodium chloride should be increased. It should be higher than 10 wt. % preferably higher than 15 wt. % to attain the purpose. Thus, a larger amount of sodium chloride as the impurity is included in the anhydrous sodium carbonate crystal from the mother liquor adhered on the crystal. In order to prevent the trouble, the anhydrous sodium carbonate crystal should be washed. During the washing, the surface of the anhydrous sodium carbonate crystal is disadvantageously changed into sodium carbonate monohydrate.

It is not impossible to attain the purpose by using the boiling point under high pressure with a small amount of sodium chloride. However, the operation under the atmospheric pressure is desired.

The inventors have studied to overcome the problem and have found that the amount of sodium chloride can be remarkably reduced by combining sodium hydroxide with sodium chloride. That is, the amount of sodium chloride can be remarkably reduced by incorporation of a small amount of sodium hydroxide. The same effect in the case of only sodium chloride is attained by using a smaller amount of the total of sodium chloride and sodium hydroxide. Moreover, as surprising effect of the combination of sodium chloride and sodium hydroxide, the crystal habit modification effect for forming an anhydrous sodium carbonate crystal having relatively spherical shape and large size has been found.

The inventors have studied on effect of the crystal habit modifier to find the fact when sodium chloride and sodium hydroxide are combined, the synergistic effect is given. Thus, it is not always necessary to combine them. Only one component of sodium chloride or sodium hydroxide imparts certain crystal habit modification effect.

This will be further illustrated in detail in the following example.

Referring to FIG. 1 prepared by the inventors, this will be further illustrated.

FIG. 1 is a graph showing transition curve between sodium carbonate monohydrate and anhydrous sodium carbonate. The left lower region X to the transition curve shows the sodium carbonate monohydrate region and the right upper region Y to the transition curve shows the anhydrous sodium carbonate region.

Referring to FIG. 1, the effect for reducing the transition temperature to the concentration of sodium hydroxide and the concentration of sodium chloride is studied. The results are shown in Table 1.

TABLE 1

| NaCl (wt. %) | ΔT/NaOH (°C./% NaOH) | NaOH (wt. %) | ΔT/NaCl (°C./% NaCl) |
|---|---|---|---|
| 15 | 1.083 | 20 | 0.82 |
| 10 | 0.872 | 15 | 0.74 |
| 5 | 0.737 | 10 | 0.69 |
| 0 | 0.642 | 5 | 0.54 |
|  |  | 0 | 0.40 |

In Table 1, left column, ΔT/NaOH means a degree for reducing the transition temperature ΔT with 1% NaOH. When sodium chloride is not present, the transition temperature is reduced for only 0.642° C. per 1% NaOH, When 10 wt. % NaCl is present, the transition temperature is reduced for 0.872° C. per 1% NaOH. (The transition temperature lowering coefficient is increased for 36%.)

On the other hand, in Table 1, right column, ΔT/NaCl means a degree for reducing the transition temperature ΔT with 1% NaOH. When sodium hydroxide is not present, the transition temperature is reduced for only 0.40° C. per 1% NaCl. When 20 wt. % NaOH is present, the transition temperature is reduced for 0.82° C. per 1% NaCl. (The transition temperature lowering coefficient is increased for 105%).

The fact of remarkable synergistic effect of sodium chloride and sodium hydroxide to the transition temperature lowering coefficient is found in the present invention.

In view of the above-mentioned facts and the purity of the product, the content of sodium chloride is preferably in a range of 0.5 to 10 wt. %, especially 0.5 to 9 wt. %.

On the other hand, in order to impart the effect of the present invention, it is necessary to incorporate sodium hydroxide at a ratio of 0.3 to 20 wt. %, especially 1.5 to 15 wt. %.

The reason of the range of sodium chloride is as follows. When it is less than 0.5 wt. %, the effect of sodium chloride is quite small. When it is more than 10 wt. %, further increase of the effect of sodium chloride is not found and the amount of sodium chloride included in the product of the anhydrous sodium carbonate crystal is increased.

The reason of the range of sodium hydroxide is as follows.

When it is less than 0.3 wt. %, the effect of sodium hydroxide is not found. When it is more than 20 wt. %, the growth of the anhydrous sodium carbonate crystal is inhibited and the viscosity of the solution is increased to cause a trouble in the operation.

In accordance with the incorporation, the crystallization can be carried out under near the atmospheric pressure such as 0.7 to 1.3 atm.

In usual, an amount of the impurity in the sodium carbonate product should be low, for example, a content of sodium chloride should be less than 0.5 wt. % in Japanese Industrial Standard. In accordance with the process of the present invention, the anhydrous sodium carbonate crystal obtained by crystallization and separation is in the range of Japanese Industrial Standard without the water washing which requires a complicated operation and causes formation of sodium carbonate monohydrate.

Figure 2:
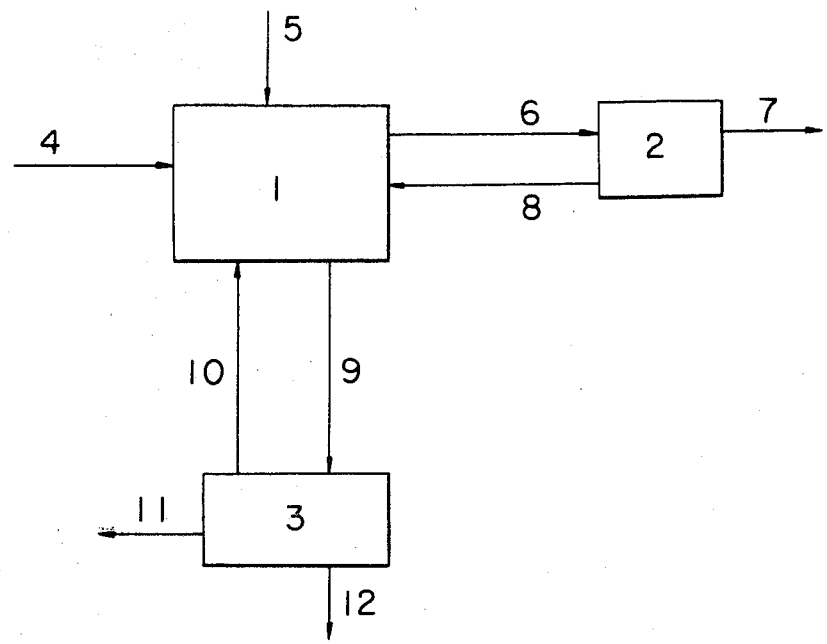
FIG. 2 is a block diagram of one embodiment of the process of the present invention.

One embodiment of the process of the present invention will be illustrated referring to FIG. 2.

FIG. 2 is a block diagram of one embodiment of the process of the present invention using light porous sodium carbonate as the source.

The light porous sodium carbonate is fed through a line (5) into A zone (1). Water is fed through a line (6) into A zone. After the operation of the process, a feed of water is not substantially required. Water is discharged from the system by discharging the anhydrous sodium carbonate crystal or a part of steam. Therefore, water can be fed through the line 6 for compensation. The slurry containing the sodium carbonate monohydrate crystal crystallized in A zone is fed through the line (2) into B zone. The heat generated in A zone is discharged as steam and is fed through the line (10) into B zone. If necessary, a blower (3) can be placed in the line (10). In B zone, sodium chloride and sodium hydroxide are fed through the line (9). Sodium chloride and sodium hydroxide are recycled in the system. Only the portions discharged from the system, sodium chloride and sodium hydroxide are fed through the line (9). The anhydrous sodium carbonate crystal crystallized in B zone is discharged with a part of the solution through the line (11) into B zone, and the crystal is separated from the solution by a separator (4). The solution is returned through a line (13) into B zone. The crystal is fed through a line (12) in a drying step. On the other hand, the supernatant in B zone is recycled through a line (7) into A zone.

The process using sodium hydroxide and sodium bicarbonate or a sodium hydroxide carbonated product as the source will be illustrated.

Amounts of sodium hydroxide and sodium bicarbonate in A zone are not critical and they are usually at stoichiometric molar ratio of 1:1 to 2:1 or slightly excess of sodium hydroxide. The slurry containing sodium carbonate monohydrate formed in A zone can be separated and the solid component can be fed into B zone, however, it is usually fed in the form of the slurry into B zone. A part of the slurry or the mother liquor is separated and water is evaporated in a triple effect evaporator to crystallize sodium carbonate monohydrate, but not to precipite calcium or magnesium component or sodium chloride. A part or whole of the mother liquor of the slurry at the outlet of the evaporator is purged. The residual sodium carbonate monohydrate crystal in the form of solid or slurry is fed into A zone and/or B zone. By the operation, the amount of the impurities in the mother liquor in B zone can be reduced not to substantially affect to the purity of the product.

In B zone to which the sodium carbonate monohydrate crystal is fed from A zone, sodium chloride and/or sodium hydroxide are fed to give the condition for the anhydrous sodium carbonate region shown in FIG. 1. It is preferable to give the condition of the temperature for crystallizing the anhydrous sodium carbonate crystal at the contents of 0.5 to 10 wt. % of sodium chloride and 0.3 to 20 wt. % of sodium hydroxide.

The anhydrous sodium carbonate crystal is separated by a separator. The temperature in the separator is preferably the same or higher than the operation temperature in B zone. The mother liquor separated in the separator is recycled into A zone and/or B zone and the separated anhydrous sodium carbonate crystal is usually dried to be the product. When special high purity is required, a washing step can be employed. In the washing step, an aqueous solution of sodium hydroxide at high temperature is preferably used, whereby the change of the surface of the anhydrous sodium carbonate crystal into sodium carbonate monohydrate is prevented. Sodium hydroxide adhered on the surface by the washing can be converted into anhydrous sodium carbonate by drying it in carbon dioxide gas at high temperature.

In the above-mentioned process, the crystal grains have relatively large uniform size. If a small amount of fine crystal grains is removed, the crystal grains are sieved before or after the separator by sieving with or without a solution and the fine crystal grains are returned to A zone, whereby large crystal grains can be obtained without increasing the feed of heat.

In the above-mentioned process, the other advantage is to effectively utilize steam generated in A zone. As the energy saving method, it is important. The problem will be further illustrated in detail.

The aqueous solution of sodium hydroxide and sodium bicarbonate are fed into the sodium carbonate monohydrate crystallizing zone (A zone) to produce the slurry containing sodium carbonate monohydrate crystal.

(a) A part of the slurry or the mother liquor of the slurry is separated and water is evaporated by the triple effect evaporator to concentrate it to crystallize the sodium carbonate monohydrate crystal. The slurry discharged from the evaporator is fed into A zone or the anhydrous sodium carbonate crystallizing zone (B zone) with or without purging a part of the mother liquor.

(b) The residual slurry formed in A zone is fed into B zone.

(c) The anhydrous sodium carbonate crystal is produced in the presence of sodium chloride and/or sodium hydroxide in B zone and the slurry containing the crystal is discharged from B zone.

(d) The slurry discharged from B zone is separated by a separator into the anhydrous sodium carbonate crystal and the mother liquor and the mother liquor is transferred into A zone and/or B zone.

(e) Steam generated in A zone is condensed in B zone whereby the reaction heat generated in A zone is fed into B zone. The process of the invention is performed by these steps.

Referring to the drawing, the process is illustrated.

Figure 3:
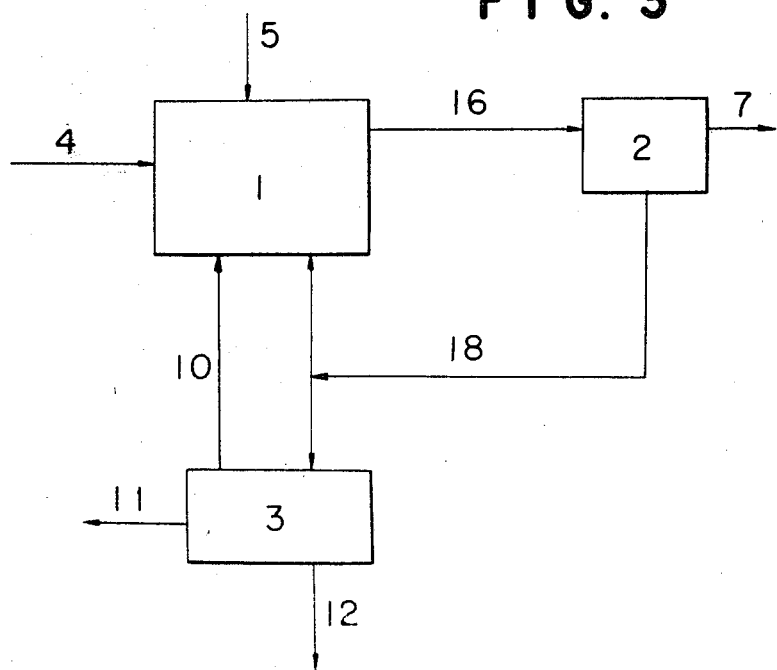
FIG. 3 is a block diagram of the other embodiment of the process of the present invention.

FIG. 3 is a block diagram of one embodiment of the process of the present invention. In A zone (101), the aqueous solution of sodium hydroxide (107) and sodium bicarbonate (108) are fed. The aqueous solution of sodium hydroxide can be solid sodium hydroxide and water. A part of the slurry or the mother liquor of the slurry of sodium carbonate monohydrate produced in A zone (101) is discharged through the line (109) and is fed into the evaporator (104). The evaporator can be one stage evaporator, but preferably a multi effect evaporator having two or more stages. The mother liquor or the slurry from which water is evaporated in the evaporator (104) is discharged as the slurry of sodium carbonate monohydrate produced in the evaporation step from the evaporator, and is fed into the purge zone (105) for removing a part of the impurities from the mother liquor. The purged mother liquor is discharged through the line (110) out of the system. For example, it is used as the sodium bicarbonate washing solution in an ammonium soda process. On the other hand, the residual slurry is fed through the line (111) into A zone (101) or B zone (102). It is not always necessary to discharge it from the purge zone (105) and the purge can be performed under monitoring the level of the impurities in the system at needed times.

On the other hand, a most part of the slurry is fed into B zone (102) (line (112)). In B zone, sodium chloride is fed through the line (113) and sodium hydroxide is fed through the line (114) so as to give 0.5 to 10 wt. % of sodium chloride and 0.3 to 20 wt. % of sodium hydroxide in B zone depending upon the contents of sodium chloride and sodium hydroxide in the slurry fed from A zone, the slurry fed from the evaporator; and the mother liquor fed from the separator. When the concentration of sodium chloride or the concentration of sodium hydroxide is over said range, the mother liquor is purged through the purge line (110).

The reason of the limitations of the ranges of the concentrations of sodium chloride and sodium hydroxide in B zone is as follows.

The slurry of the anhydrous sodium carbonate crystal formed in B zone is fed through the line (115) into the separator (103) and the solid liquid separation is carried out under preventing the conversion of anhydrous sodium carbonate into sodium carbonate monohydrate. The separated mother liquor is recycled through the line (116) into A zone and/or B zone. The anhydrous sodium carbonate crystal separated by the separator is dried in a gas containing carbon dioxide at high temperature to obtain the product (118) or is washed with an aqueous solution of sodium hydroxide and dried in the drying step to obtain the product (117).

When the resulting anhydrous sodium carbonate crystal is dissolved in water to prepare an aqueous solution of sodium carbonate, sometimes, turbidity of the solution is caused. In order to prevent such turbidity, the anhydrous sodium carbonate crystal should be heat-treated at higher than 160° C., especially higher than 180° C. In particular, it is heat-treated at 180° C. for longer than 20 minutes or at 200° C. for longer than 5 minutes. The effect of the heat-treatment may be attained by drying the crystal at higher than 160° C. in the drying step.

In the optimum process of utilizing the reaction heat in A zone, the reaction heat in A zone is discharged as steam and the steam is fed through the line (119) (with compression by a pump in the line (119), if necessary) into B zone to condense it. In order to condense the steam in B zone, it is preferable to increase the concentration of sodium hydroxide in B zone over the concentration of sodium hydroxide in A zone, preferably for 0.3 to 17 wt.%. Therefore, the concentration of sodium hydroxide in A zone is preferably upto 3 wt.%.

The surprising effect found by the inventors in the process is that the anhydrous sodium carbonate crystal obtained by the process of the invention is dense to be a bulk density of 1.4 to 1.6 in comparison with 1.0 to 1.1 of the bulk density of the anhydrous sodium carbonate crystal obtained by the conventional process.

The resulting anhydrous sodium carbonate crystal grains have diameters of 700 to 100μ for 90% thereof and have uniform size and high hardness as the advantages of the present invention.

Moreover, the required heat can be $\frac{1}{3}$ to 1/7 time of the required heat in the conventional process. The energy saving process is one of the advantage of the present invention.

The present invention will be further illustrated by certain examples and references which are provided for purposes of illustration only.

EXAMPLES 1 TO 3

In accordance with the process of FIG. 2, the dense anhydrous sodium carbonate crystal was obtained by using light porous anhydrous sodium carbonate, sodium chloride and sodium hydroxide shown in Table 2.

Solutions having the compositions shown in Table 3 are prepared and kept in A zone and B zone. The porous sodium carbonate having the composition shown in Table 2 was fed at a rate of 1000 kg./hour and the supernatant was fed at a rate of P kg./hour into A zone. Water was evaporated to keep the temperature in A zone shown in Table 3. The resulting slurry was fed through the line 8 into B zone at a rate of Q kg./hour of sodium carbonate monohydrate and at a rate of R kg./hour of the aqueous solution. Steam generated in A zone was fed through the line (10) into B zone at a rate of S kg./hour. When steam is compressed, the steam is compressed by the blower (3) to the specific pressure.

On the other hand, in B zone kept at T°C., the anhydrous sodium carbonate was crystallized at a rate of U kg./hour and was discharged through the lines (11), (12) out of the system, and dried in the atmosphere containing carbon dioxide. On the other hand, the supernatant was recycled through the line (7) into A zone at a rate of P kg./hour. After the start of the operation, water was fed through the line (6)

When sodium chloride or both of sodium hydroxide and sodium chloride is fed in B zone, the sodium chloride and sodium hydroxide shown in Table 2 were fed through the line (9) at the specific rates. After the start of the operation, sodium hydroxide and sodium chloride were fed through the line (9) in compensation.

The conditions and results of the examples are shown in Table 3.

TABLE 2

|  | $Na_2CO_3$ (wt. %) | NaCl | NaOH | $H_2O$ |
|---|---|---|---|---|
| Porous sodium A | 99.8 | 0 | 0 | 0 |
| Porous sodium B | 99.5 | 0.4 | 0 | 0.2 |
| Porous sodium C | 99.6 | 0.26 | 0 | 0.1 |
| Sodium chloride | 0 | 97.4 | 0 | 1.5 |
| NaOH aq sol | 0.1 | 1.0 | 48 | 51 |

REFERENCE 4

Light porous sodium carbonate obtained by thermal decomposition of sodium bicarbonate was converted into sodium carbonate monohydrate and was further converted by STD method into the anhydrous sodium carbonate crystal by the conventional process. The characteristics are also shown in Table 3.

TABLE 3

|  | 1 | 2 | 3 | 4 *4 |
|---|---|---|---|---|
| Condition of operation |  |  |  |  |
| Kind of porous $Na_2CO_3$ | A | C | B | — |
| Composition in A zone (wt. %) |  |  |  |  |
| $Na_2CO_3$ | 30.7 | 23.2 | 9.5 | — |
| NaCl | 0 | 6.3 | 9.4 | — |
| NaOH | 0 | 0 | 9.8 | — |
| Composition in B zone (wt. %) |  |  |  |  |
| $Na_2CO_3$ | 28.8 | 24.5 | 13.4 | — |
| NaCl | 0 | 5 | 7.6 | — |
| NaOH | 0 | 0 | 8 | — |
| Temperature in A zone (°C.) | 106 | 106 | 95 | — |
| Temperature in B zone (°C.) | 115 | 112 | 103 | — |
| Pressure in A zone (atm) | 0.95 | 0.95 | 0.61 | — |
| Pressure in B zone (atm) | 1.32 | 1.21 | 1 | — |
| Steam pressure in A zone → B zone (atm) | 1.37 | 1.26 | 1.05 | — |
| P | 2985 | 3420 | 3390 | — |
| Q | 1265 | 1390 | 1390 | — |
| R | 2530 | 2785 | 2775 | — |
| S | 225 | 285 | 260 | — |
| T | 115 | 112 | 105 | — |
| U | 980 | 985 | 990 | — |

TABLE 3'

|  | 1 | 2 | 3 | 4 *4 |
|---|---|---|---|---|
| Characteristics of dried anhydrous sodium carbonate crystal |  |  |  |  |
| Average particle diameter (μ) | 60 | 500 | 680 | 600 |
| Bulk density (g/cm³) *1 | 1.50 | 1.61 | 1.60 | 1.01 |
| Angle of repose (degree) | 41 | 37 | 35 | 43 |
| Chemical composition (wt. %) |  |  |  |  |
| $Na_2CO_3$ | 99.8 | 99.6 | 99.5 | 99.5 |
| NaCl | 0 | 0.26 | 0.4 | 0.35 |
| NaOH | 0 | 0 | 0 | 0 |
| Wearing test *2 | 0.3 | 0.1 | 0.1 | 1.2 |
| Energy consumption (k cal/product ton) | *3 46 × $10^3$ | *3 44 × $10^3$ | *3 42 × $10^3$ | 230 × $10^3$ |

*1: 200 Gram of a sample powder is charged in a 200 ml mascylinder which is vibrated by a vibrator. A volume in constant is measured and calculated.
*2: A dried sample powder is sieved through a 80 mesh sieve and 50 g. of the remained powder is charged with 15 pieces of agate balls (weight 35 g.) in a 250 ml container and is ground at 170 rpm for 30 minutes. The ground sample is sieved through a 200 mesh sieve and the weight of the powder sieved through the 200 mesh sieve is weighed and the weight ratio is shown.
*3: Most of energy consumption in the process of the present invention is to drive the blower and to dry the product.
*4: Reference.

EXAMPLES 5 TO 11

In accordance with the process shown in FIG. 3, and anhydrous sodium carbonate crystal was obtained.

In a cylindrical A zone, an inner cylinder was concentrically placed. In the inner cylinder, an impeller was equipped to form a flow for maintaining a slurry. In A zone, an aqueous solution of sodium hydroxide (48 wt.%) was fed and a sodium bicarbonate crystal was fed at a rate of 1000 kg./hours.

The supernatant mother liquor was discharged from A zone and concentrated in an evaporator to crystallize sodium carbonate monohydrate. The mother liquor was returned into A zone or partially purged. The conditions in A zone and B zone are shown in Table 4. The compositions of the mother liquors in A zone and B zone were controlled by the rate of the mother liquor fed from A zone into B zone (the rate of the solution from B zone to A zone is also given) and amounts of sodium hydroxide and sodium chloride fed into B zone. On the other hand, steam generated in A zone was compressed by a blower to about 1.1 atm. and fed into B zone to condense it. The anhydrous sodium carbonate crystal formed in B zone was discharged as the slurry. (the anhydrous sodium carbonate crystal in the slurry of 0.6 kg./kg slurry) and treated by a centrifugal separator to perform the solid-liquid separation. The separated mother liquor was returned to B zone. The separated anhydrous sodium carbonate was dried in a gas containing about 10 wt.% of $CO_2$ at 300° C. to obtain the product.

The characteristics of the product are shown in Table 4. In Table 4, the product passed through a 80 mesh sieve was returned to feed it in A zone in Example 6.

EXAMPLE 12

In the apparatus used in Examples 5 to 11, an aqueous solution of sodium carbonate (NaOH: 48 wt.%) was fed at a rate of 1320 kg./hour and 100% carbon dioxide gas was fed at a rate of 210 Nm³/hour and the anhydrous sodium carbonate crystal was produced by the same process. The results are also shown in Table 4.

TABLE 4

|  | Example 5 | 6 | 7 | 8 |
|---|---|---|---|---|
| A zone |  |  |  |  |
| Mother liquor |  |  |  |  |
| NaCl concentration (wt. %) | 4.8 | 1.2 | 6.8 | 8.8 |
| NaOH concentration (wt. %) | 0 | 0.2 | 0.0 | 0.0 |
| Temperature (°C.) | 100 | 98 | 100 | 100 |
| Pressure (atm) | 1.0 | 1.0 | 1.0 | 1.0 |
| Flow from A zone to B zone |  |  |  |  |
| Flow rate of slurry (kg/hr) | 1590 | 2140 | 2730 | 3480 |
| Concentration of slurry (wt. %) *1 | 95 | 70 | 50 | 40 |
| Steam rate (kg/hr) | 40 | 28 | 24 | 15 |
| Flow rate from A zone to | 1270 | 1050 | 1450 | 1680 |

TABLE 4-continued

|  | Example | | | |
|---|---|---|---|---|
|  | 5 | 6 | 7 | 8 |
| evaporator (kg/hr) |  |  |  |  |
| Slurry rate from evaporator to return (kg/hr) | 580 | 360 | 760 | 990 |
| Feed rate of NaOH | 850 | 460 | 560 | 560 |
| B zone |  |  |  |  |
| Mother liquor |  |  |  |  |
| NaCl concentration (wt. %) | 1 | 1 | 5 | 7 |
| NaOH concentration (wt. %) | 15 | 10 | 11 | 8 |
| Temperature (°C.) | 103 | 105 | 105 | 104 |
| Pressure (atm) | 1 | 1 | 1 | 1 |
| Mother liquor rate from B zone to A zone (kg/hr) | 470 | 1250 | 1880 | 2620 |
| Discharge rate of anhydrous crystal (kg/hr) | 1250 | 1250 | 1252 | 1253 |
| Feed rate of NaOH (kg/hr) | 170 | 550 | 450 | 440 |

TABLE 4'

|  | Example | | | |
|---|---|---|---|---|
|  | 9 | 10 | 11 | 12 |
| A zone |  |  |  |  |
| Mother liquor |  |  |  |  |
| NaCl concentration (wt. %) | 12.3 | 16.5 | 16.5 | 8.5 |
| NaOH concentration (wt. %) | 0.0 | 0.0 | 0.0 | 0 |
| Temperature (°C.) | 98 | 95 | 95 | 100 |
| Pressure (atm) | 1.0 | 1.0 | 1.0 | 1.0 |
| Flow from A zone to B zone |  |  |  |  |
| Flow rate of slurry (kg/hr) | 3670 | 5160 | 5140 | 2250 |
| Concentration of slurry (wt. %) | 40 | 30 | 30 | 40 |
| Steam rate (kg/hr) | 8 | 0 | 0 | 0 |
| Flow rate from A zone to evaporator (kg/hr) | 2300 | 4270 | 3800 | 1860 |
| Slurry rate from evaporator to return (kg/hr) | 620 | 3590 | 3070 | 1060 |
| Feed rate of NaOH | 710 | 910 | 607 | 382 |
| B zone |  |  |  |  |
| Mother liquor |  |  |  |  |
| NaCl concentraton (wt. %) | 10 | 15 | 15 | 7 |
| NaOH concentration (wt. %) | 5 | 1 | 1 | 8 |
| Temperature (°C.) | 103 | 105 | 105 | 104 |
| Pressure (atm) | 1 | 1 | 1 | 1 |
| Mother liquor rate from B zone to A zone (kg/hr) | 2670 | 3910 | 3970 | 1640 |
| Discharge rate of anhydrous crystal (kg/hr) | 1250 | 1262 | 1250 | 830 |
| Feed rate of NaOH (kg/hr) | 290 | 80 | 390 | 280 |

|  | 5 | 6 | 7 | 8 |
|---|---|---|---|---|
| Separation of fine powder and recovery | none | none | use | none |
| Purged solution | use | use | use | use |
| Cake washing | none | none | none | none |
| Product |  |  |  |  |
| Bulk density | 1.55 | 1.55 | 1.50 | 1.65 |
| Angle of repose | 36 | 35 | 36 | 34 |
| Particle size (wt. %) |  |  |  |  |
| 32 mesh < | 13.6 | 15.8 | 10.5 | 18.4 |
| 32-60 | 45 | 53.5 | 66.1 | 55.7 |
| 60-80 | 20.8 | 11.2 | 23.4 | 7.4 |
| 80-150 | 18.2 | 14.5 | 0 | 14.0 |
| 150> | 3.8 | 5.0 | 0 | 4.5 |
| Average diameter (μ) | 270 | 300 | 300 | 350 |
| Purity |  |  |  |  |
| Ca content (ppm) | 0.002 | 0.002 | 0.002 | 0.002 |
| NaCl content (wt. %) | 0.08 | 0.08 | 0.26 | 0.34 |

|  | 9 | 10 | 11 | 12 |
|---|---|---|---|---|
| Separation of fine powder and recovery | none | none | none | none |
| Purged solution | use | none | use | use |
| Cake washing | none | none | use | none |
| Product |  |  |  |  |
| Bulk density | 1.60 | 1.55 | 1.55 | 1.65 |
| Angle of repose | 36 | 38 | 38 | 33 |
| particle size (wt. %) |  |  |  |  |

TABLE 4'-continued

| 32 mesh < | 23.6 | 8.5 | 8.5 | 18 |
|---|---|---|---|---|
| 32-60 | 45.7 | 39.7 | 39.7 | 55.8 |
| 60-80 | 14.4 | 26.1 | 26.1 | 7.5 |
| 80-150 | 14.2 | 23.8 | 23.8 | 14.2 |
| 150> | 2.1 | 1.9 | 1.9 | 4.5 |
| Average diameter (μ) | 320 | 250 | 250 | 350 |
| Purity |  |  |  |  |
| Ca content (ppm) | 0.002 | 0.002 | 0.002 | 0.002 |
| NaCl content (wt. %) | 0.51 | 0.70 | 0.20 | 0.32 |

*1: Only crystal was separated and returned to B zone (5% is adhered mother liquor)

We claim:

1. A process for producing an anhydrous sodium carbonate crystal which comprises:
   (a) continuous feeding an aqueous solution of sodium carbonate in a sodium carbonate monohydrate crystallizing zone;
   (b) crystallizing sodium carbonate mono hydrate crystal in said zone;
   (c) evaporatively crystallizing said sodium carbonate hydrate to an anhydrous sodium carbonate crystal by adding both NaCl and NaOH whereby crystals of anhydrous sodium carbonate having an average diameter of about 100μ to about 700μ are obtained in an anhydrous sodium carbonate crystallizing zone, producing a mother liquor and water vapor,
   (d) separating said mother liquor and recycling said separated mother liquor into said sodium carbonate hydrate crystallizing zone; and
   (e) recycling heat contained in said water vapor by compressing said water vapor and feeding said water vapor into said anhydrous sodium carbonate crystallizing zone.

2. The process according to claim 1 wherein said aqueous solution of sodium carbonate is produced by carbonating sodium hydroxide or reacting sodium hydroxide and sodium bicarbonate or dissolving light porous anhydrous sodium carbonate.

3. The process according to claim 1 wherein fine crystals of said anhydrous sodium carbonate crystal are recycled to said sodium carbonate hydrate crystallizing zone after a separation.

4. The process according to claim 1 wherein after said addition sodium chloride concentration ranges from 0.2 to 10 wt. % and sodium hydroxide concentration ranges from 0.3 to 23 wt. %.

5. The process according to claim 1 wherein said anhydrous sodium carbonate crystal crystallized in said anhydrous sodium carbonate crystallizing zone is separated from said mother liquor and is washed with sodium hydroxide solution in a stable region for anhydrous sodium carbonate.

6. The process according to claim 5 wherein said washed anhydrous sodium carbonate crystal is dried in a stable region for anhydrous sodium carbonate as an atmosphere containing carbon dioxide gas.

7. The process according to claim 6 wherein said drying is carried out at higher than 160° C.

8. The process of claim 7 wherein said drying is carried out at a temperature not greater than about 300° C.

9. The process of claim 6 wherein said anhydrous sodium carbonate crystal is heat-treated at higher than 160° C. after drying it.

10. The process of claim 9 wherein said heat treatment is carried out at a temperature not greater than about 300° C.